June 18, 1929.  P. W. POMEROY  1,717,936
BRAKE
Filed Jan. 16, 1928   2 Sheets-Sheet 1

INVENTOR.
P. W. Pomeroy

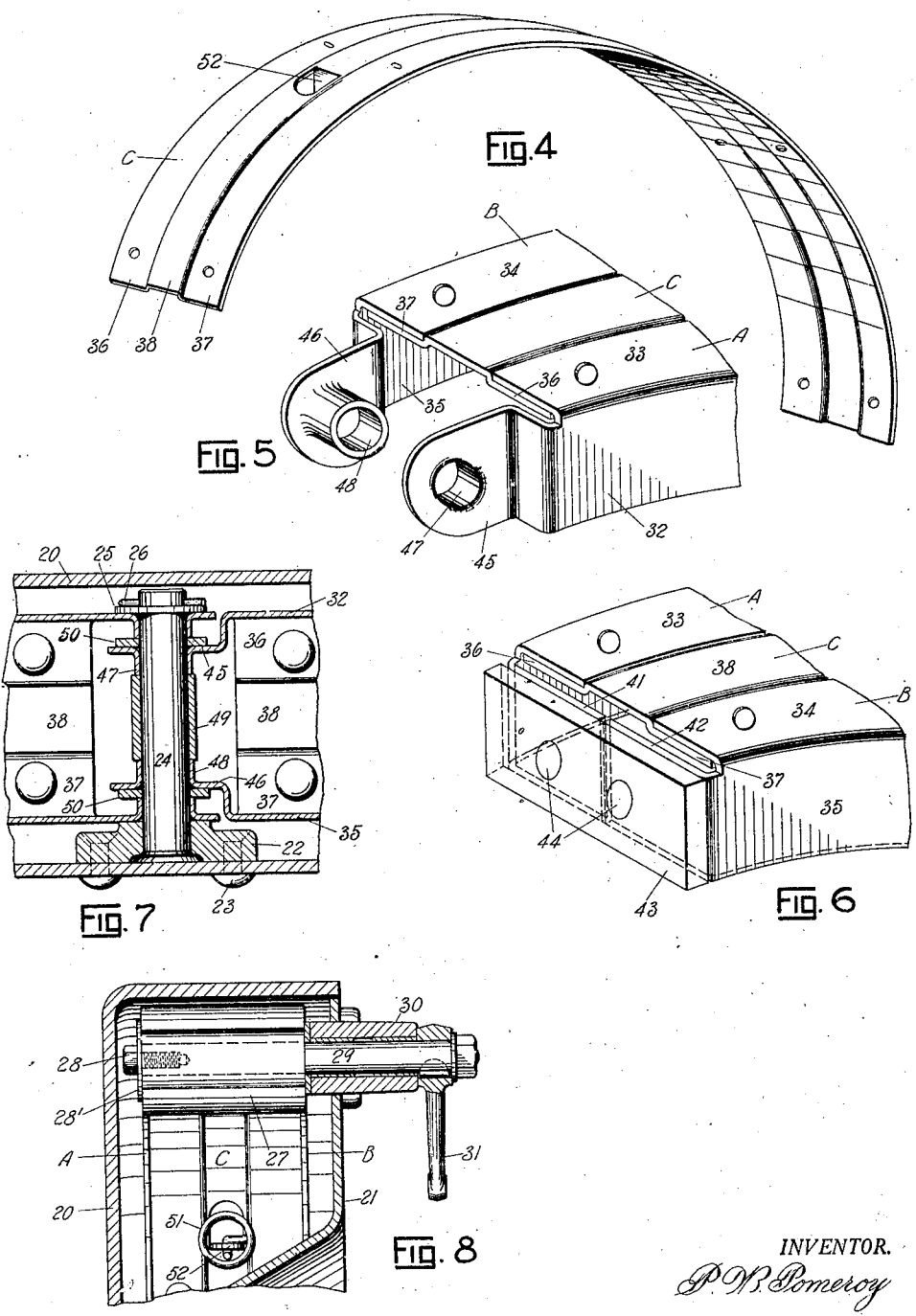

Patented June 18, 1929.

1,717,936

UNITED STATES PATENT OFFICE.

PERCY W. POMEROY, OF SOUTH BEND, INDIANA, ASSIGNOR TO THE STUDEBAKER CORPORATION, OF SOUTH BEND, INDIANA, A CORPORATION OF NEW JERSEY.

BRAKE.

Application filed January 16, 1928. Serial No. 247,193.

This invention relates to brake shoes and particularly to shoes of the internal-expanding type, the principal object being to form a brake shoe entirely of pressed-metal stampings, to provide a construction which is very rigid, light in weight and economical to manufacture.

Another object is to provide a brake shoe comprising an arcuate plate having a rib on its outer face and a pair of reinforcing members secured to the outer face at opposite sides of the rib.

Another object is to provide a brake shoe comprising a pressed-metal band having an intermediate longitudinal rib formed integral with its outer face, and a pair of reinforcing angle members secured to the outer face, each having the marginal edge of its axial flange abutting against a side of the rib.

A further object is to provide a brake shoe comprising an arcuate band formed integral with the outer surface thereof, arcuate lining supporting parts secured to the band at opposite sides of the rib, spaced reinforcing flanges integral with the outer free edges of the lining supporting parts, and an arcuate reinforcing band secured to the outer faces of the rib and lining supporting parts.

These being among the objects of the present invention, the same consists of certain features of construction and combinations of parts to be hereinafter described with references to the accompanying drawings, and then claimed, having the above and other objects in view.

In the accompanying drawings which illustrate a suitable embodiment of the present invention, Figure 1 is a section of the vehicle brake taken just inside the brake drum head, showing the brake shoes in elevation.

Figure 4 is an enlarged perspective view of the pressed-metal spacer band.

Figure 5 is a fragmentary perspective view of the anchored end of one of the brake shoes.

Figure 6 is a fragmentary perspective view of the cam contact end of one of the brake shoes.

Figure 7 is a section taken on the line 7—7 of Figure 1, showing the brake shoes pivoted to a common anchor pin.

Figure 8 is a section taken on the line 8—8 of Figure 1, showing the brake shoe operating cam.

Figure 1:
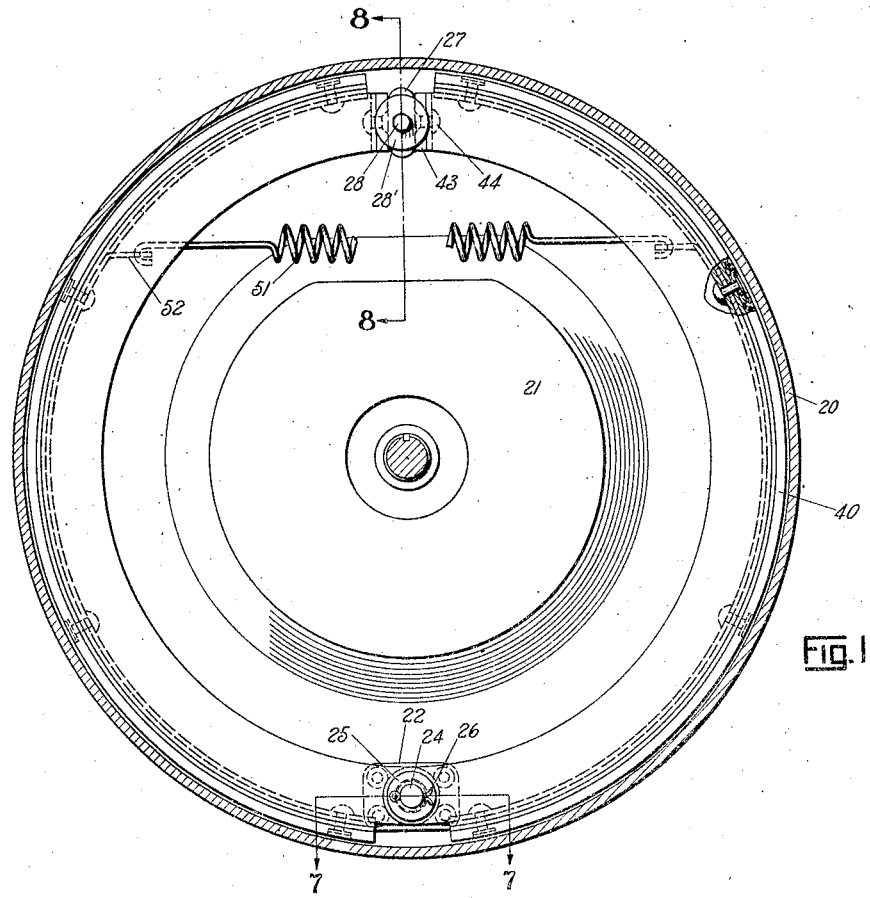
Figure 2:
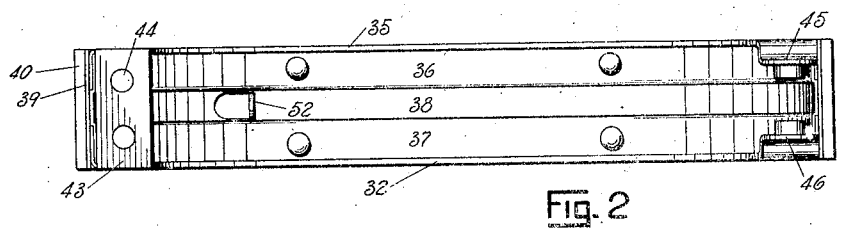
Figure 2 is a plan view of one of the brake shoes looking toward the concave surface thereof.
Figure 3:
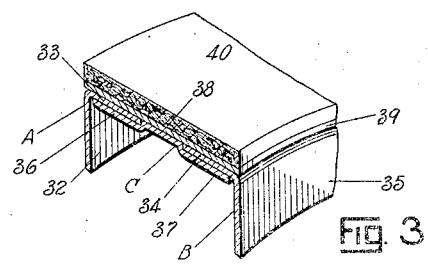
Figure 3 is a fragmentary view of one of the brake shoes, showing a portion of the same in section.

Referring to the accompanying drawings in which like numerals refer to like parts throughout the several views, the vehicle brake chosen for illustration comprises a brake drum 20 mounted upon a vehicle wheel or drive shaft. Adjacent to and closing in the open end of the drum 20 is a stationary dust cover or backing plate 21, mounted on a steering knuckle or other stationary part, not shown. An anchor bracket 22 secured to the inner surface of the backing plate 21 by rivets or other suitable means of attachment, is provided with a central opening which receives and securely holds one end of an anchor pin 24. The brake shoes which will be described in detail later in the specification, are pivotally supported within the drum 20 on the anchor pin 24 and are adapted to be moved outwardly into engagement with the brake drum. A washer 25 and pin 26 extending through the end of the anchor pin 24, prevent undue movement of the brake shoes longitudinally of the anchor pin 24.

The free ends of the brake shoes contact against opposite sides of a rotatable operating cam 27 which is secured by means of a cap screw 28 and a washer 28' to an end of a rotatable shaft 29. The shaft 29 is journaled in a bracket 30 secured to the backing plate 21, and is provided with a rocker arm 31 at its outer end projecting through the journal bracket 30. The rocker arm 31 is connected through suitable means to some source of braking pressure such as, a foot pedal or hand lever (not shown).

The brake shoes are preferably constructed entirely of pressed-metal stampings assembled together to provide a construction which is very rigid, light in weight and economical to manufacture. Each brake shoe is semi-circular in shape and is formed of two spaced arcuate angle members A and B, the angle member A comprising a radial reinforcing web 32 having an integral axial flange 33. The angle member B is likewise comprised of a radial reinforcing web 35 having an integral axial flange 34. Each shoe is also provided with an arcuate supporting and spacing plate C having coplanar side angle-supporting portions 36 and 37 and a central rib 38 extending throughout its entire length as shown in perspective in Figure 4. This spacing band C may be easily and economically rolled from flat stock to the shape shown and described. The axial flanges 33 and 34 are respectively riveted, bolted, welded or otherwise secured to the coplanar side portions 36 and 37 of the member C, with their outer surfaces lying in the same plane as the outer arcuate surface of the rib 38, and with their marginal edges abutting against opposite sides of the rib 38. The side portions 36 and 37 respectively support and hold the angle members A and B in spaced relationship, and in addition, reinforce the axial flanges 33 and 34 to provide a more rigid structure. The coplanar outer surfaces of the rib 38 and flanges 33 and 34, form a supporting surface for an arcuate reinforcing band 39, which is welded or otherwise secured thereto. Brake friction facing 40 is suitably secured to the band 39, but it is to be understood however, that the friction facing 40 may be secured directly to the outer faces of the portions 38, 33 and 34 if desired, without the use of the reinforcing band 39. It is very desirable in some instances, to use the reinforcing band 39 in order to give added strength and rigidity to the brake shoe without adding excessive weight.

The angle members A and B are respectively provided with radial tongues 41 and 42 extending from the webs 32 and 35 beyond the axial flanges 33 and 34. These tongues 41 and 43 as shown in Figure 6, are bent inwardly toward each other to present transverse radial faces, to which a hardened steel cam contact member 43 is secured by rivets 44 or any other suitable means.

The angle members A and B at the other end of each shoe, are also respectively provided with tongues 45 and 46, extending beyond the end of the member C. The ends of these tongues 45 and 46 are respectively formed with co-axial openings 47 and 48, the metal surrounding the same being drawn inwardly to provide integral bushings. As shown in Figures 5 and 7, the tongues 45 and 46 of one of the brake shoes, are offset from the radial webs 32 and 35 toward each other so that when the shoes are assembled to the anchor pin 24, the ends thereof are telescoped as shown. A spacer bushing 49 is inserted between the integral bushings of the shoe having the offset tongues 45 and 46, and washers 50 are positioned on the anchor pin 24 between the outer faces of the offset tongues 45 and 46 of the one shoe, and the marginal edges of the integral bushings of the other shoe in order to give unobstructed pivotal movement of one brake shoe relative to the other.

A coil spring 51 having its ends hooked through tongues 52 struck from the metal comprising the ribs 38 of the members C of the brake shoes, normally holds the shoes out of contact with the brake drum 20 and draws the same toward each other so that the cam contact plates 43 engage opposite sides of the brake cam 27.

It is evident from the foregoing description, that a brake shoe has been provided which is very rigid, light in weight, and which can be economically manufactured from pressed metal.

Formal changes may be made in the specific embodiment of the invention described without departing from the spirit and substance of the broad invention, the scope of which is commensurate with the appended claims.

What I claim is:

1. A brake shoe comprising a pressed metal arcuate plate having a rib on its outer face, and a pair of reinforcing members secured to said outer face at opposite sides of said rib.

2. A brake shoe comprising a pressed metal band having a central rib pressed outwardly on its outer face, and a pair of reinforcing members secured to said outer face at opposite sides of said rib.

3. A brake shoe comprising an arcuate pressed metal band having a depression in its inner face to provide the outer face thereof with an integral radial rib, and a pair of reinforcing members secured to said outer face and abutting against opposite sides of said rib.

4. A brake shoe having a rib formed integral with its outer face, and a pair of reinforcing angle members secured to said outer face, each having the free marginal edge of one of its flanges abutting against a side of said rib.

5. A brake shoe comprising an arcuate pressed metal band having a depression formed in its inner face to provide the outer face thereof with a central arcuate rib, a pair of lining supporting parts secured to said outer face abutting against opposite sides of said rib, and spaced reinforcing webs for said lining-supporting parts.

6. A brake shoe comprising a pair of L-shaped members having axial flanges facing each other, each flange having an integral radial reinforcing web, an arcuate supporting band secured to the inner faces of said axial flanges, said band having a rib formed integral therewith abutting against the holding said axial flanges in spaced relationship.

7. A brake shoe comprising an arcuate supporting band, a rib intermediate the sides of said band formed integral therewith, arcuate lining supporting parts secured to said band at opposite sides of said rib, spaced radial webs integral with said lining supporting parts having extending tongues bent inwardly toward each other to provide transverse radial surfaces, and a cam contact member secured to said surfaces.

8. A brake shoe comprising an arcuate band having a spacer rib intermediate the sides thereof, arcuate lining supporting parts secured to said band at opposite sides of said rib, spaced radial reinforcing webs integral with said lining supporting parts, and an arcuate reinforcing band secured to the outer faces of said rib and lining supporting parts.

9. A brake shoe comprising an arcuate band having a spacer rib intermediate the ends thereof, lining supporting parts secured to said band at the opposite sides of said rib, and spaced radial reinforcing webs integral with the outer edges of said lining supporting parts, each web having a tongue extending beyond said lining supporting part provided with an opening in axial alignment with the opening in the other tongue, the metal surrounding said openings being drawn out to provide sleeves forming in effect integral bushings for said openings.

10. A brake shoe comprising an arcuate supporting band, arcuate L-sectioned lining supporting members secured face to face to said band, tongues extending inwardly toward each other to provide transverse radial surfaces formed integral with the webs of said members, and a cam contact member secured to the radial surfaces of said tongues.

11. A brake shoe comprising an arcuate supporting band, arcuate L-sectioned lining supporting members secured face to face to said band, a cam contact member extending transversely of said shoe, and means extending transversely of said shoe secured to the webs of said members for supporting said cam contact member.

Signed by me at South Bend, Indiana this 12th day of January 1928.

PERCY W. POMEROY.